United States Patent
Hipsky

(10) Patent No.: US 10,144,518 B2
(45) Date of Patent: Dec. 4, 2018

(54) DUAL ACTION CHECK VALVE WITH COMBINED RETURN AND BYPASS PASSAGES

(71) Applicant: Hamilton Sundstrand Corporation, Windsor Locks, CT (US)

(72) Inventor: Harold W. Hipsky, Willington, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1593 days.

(21) Appl. No.: 13/743,373

(22) Filed: Jan. 17, 2013

(65) Prior Publication Data

US 2014/0199931 A1   Jul. 17, 2014

(51) Int. Cl.
| | |
|---|---|
| *B64D 13/06* | (2006.01) |
| *G05D 7/01* | (2006.01) |
| *B64D 13/08* | (2006.01) |
| *F16K 15/03* | (2006.01) |
| *F04D 27/00* | (2006.01) |
| *F16K 17/196* | (2006.01) |

(52) U.S. Cl.
CPC ............. *B64D 13/06* (2013.01); *B64D 13/08* (2013.01); *F04D 27/009* (2013.01); *F16K 15/033* (2013.01); *F16K 15/035* (2013.01); *F16K 17/196* (2013.01); *G05D 7/01* (2013.01)

(58) Field of Classification Search
CPC ....... F28D 2021/0021; F28D 2021/008; F28D 2021/0092; G05D 7/0113; G05D 7/0133; G05D 7/01; B64D 13/06
USPC ............... 165/283, 41, 44, 281, 286; 454/76
See application file for complete search history.

(56) References Cited

U.S. PATENT DOCUMENTS

| | | | |
|---|---|---|---|
| 4,403,659 | A | 9/1983 | Upchurch |
| 5,133,194 | A | 7/1992 | Army, Jr. et al. |
| 6,520,257 | B2 | 2/2003 | Allamon et al. |
| 6,942,183 | B2 | 9/2005 | Zywiak |
| 7,299,880 | B2 | 11/2007 | Logiudice et al. |
| 7,334,422 | B2 * | 2/2008 | Zywiak .................. B64D 13/06 62/401 |

(Continued)

FOREIGN PATENT DOCUMENTS

| | | | | |
|---|---|---|---|---|
| DE | 4304649 | A1 * | 9/1994 | ............ F16K 15/03 |
| EP | 1790568 | A2 | 5/2007 | |

(Continued)

OTHER PUBLICATIONS

European Search Report for European Patent Application No. 14151052.9 dated May 16, 2014.

*Primary Examiner* — Keith Raymond
*Assistant Examiner* — Harry Arant
(74) *Attorney, Agent, or Firm* — Carlson, Gaskey & Olds, P.C.

(57) ABSTRACT

A combination includes a selectively driven fan and a bypass flow passage for bypassing the fan. The bypass flow passage communicates with a first check valve to allow air to flow from the bypass passage to a downstream location. A second check valve allows air driven by the fan to pass into a return passage and return to an inlet of the fan in the event that the discharge pressure from the fan overcomes a spring force associated with the second check valve. A heat exchanger pack and an environmental control system for use on an aircraft, and a method are all also disclosed.

3 Claims, 2 Drawing Sheets

(56) References Cited

U.S. PATENT DOCUMENTS

| | | |
|---|---|---|
| 7,757,502 B2 | 7/2010 | Merritt et al. |
| 8,075,274 B2 | 12/2011 | Carvalho |
| 2003/0136563 A1 | 7/2003 | Allamon et al. |
| 2004/0000406 A1 | 1/2004 | Allamon et al. |
| 2004/0000407 A1 | 1/2004 | Hernandez et al. |
| 2006/0059941 A1 | 3/2006 | Merritt et al. |

FOREIGN PATENT DOCUMENTS

| | | | |
|---|---|---|---|
| GB | 08658 A | | 8/1912 |
| GB | 2077354 A | | 12/1981 |
| GB | 8658 | * | 8/1992 |

* cited by examiner

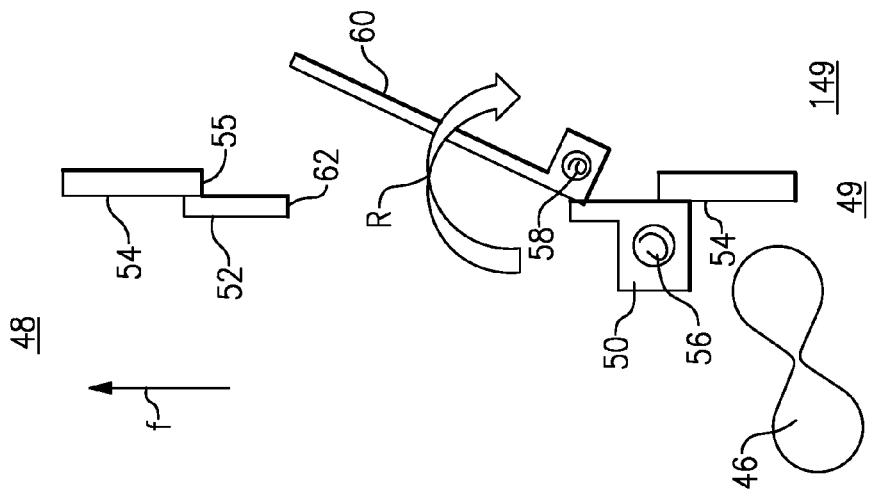
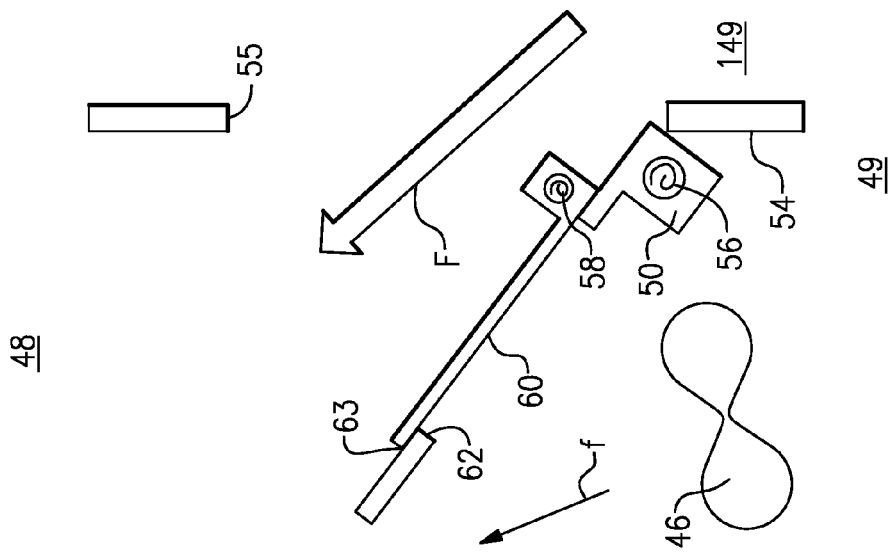
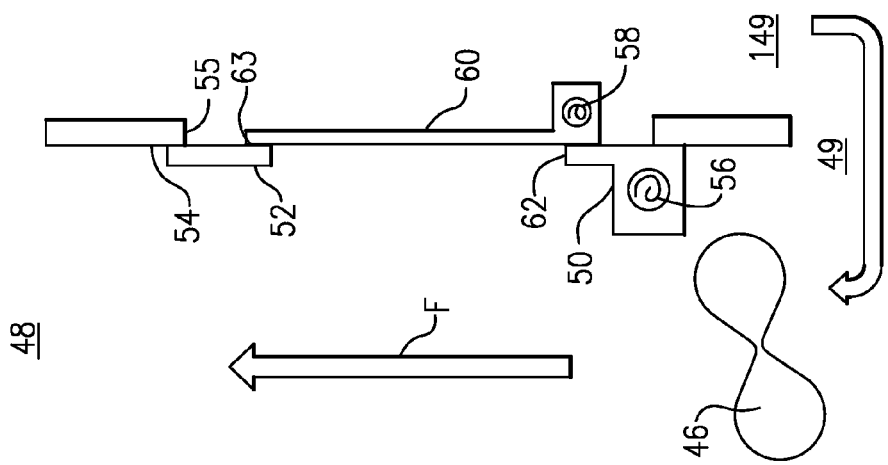

DUAL ACTION CHECK VALVE WITH COMBINED RETURN AND BYPASS PASSAGES

BACKGROUND OF THE INVENTION

This application relates to a dual action check valve associated with a selectively driven fan having a bypass flow.

In modern aircraft, air for use in the cabin, the cockpit and for other uses on the aircraft typically requires conditioning. In one known system, an air cycle machine provides air to locations on the aircraft. The air comes from a source of relatively hot air and is desirably cooled. The air being delivered into the aircraft passes through a heat exchanger pack, and ram air from outside of the aircraft is brought across the heat exchangers to cool the air to be used on the aircraft.

Typically, a ram air fan is provided in the heat exchanger pack and draws air across the heat exchangers when the aircraft is on the ground. When the aircraft is in flight, the movement of the aircraft may provide a power source for moving the air across the heat exchanger pack.

In the air, or at altitude, the fan capacity is limited. Thus, a check valve typically opens that allows the ram air to bypass the fan.

The fan is positioned downstream of the heat exchangers in the heat exchanger pack. On some occasions, the flow passages for the ram air through the heat exchangers may become clogged due to the impurities in the air. When this occurs, the flow of air to the fan may be less than desirable. The insufficient air can cause a condition called "surge" which can be detrimental to the fan.

SUMMARY OF THE INVENTION

A combination includes a selectively driven fan and a bypass flow passage for bypassing the fan. The bypass flow passage communicates with a first check valve to allow air to flow from the bypass passage to a downstream location. A second check valve allows air driven by the fan to pass into a return passage and return to an inlet of the fan in the event that the discharge pressure from the fan overcomes a spring force associated with the second check valve.

A heat exchanger pack and an environmental control system for use on an aircraft, and a method are all also disclosed.

These and other features may be best understood from the following drawings and specification.

BRIEF DESCRIPTION OF THE DRAWINGS

FIG. 2A shows the check valve in a first position.
FIG. 2B shows the check valve in a second position.
FIG. 2C shows the check valve in a third position.

DETAILED DESCRIPTION

Figure 1:
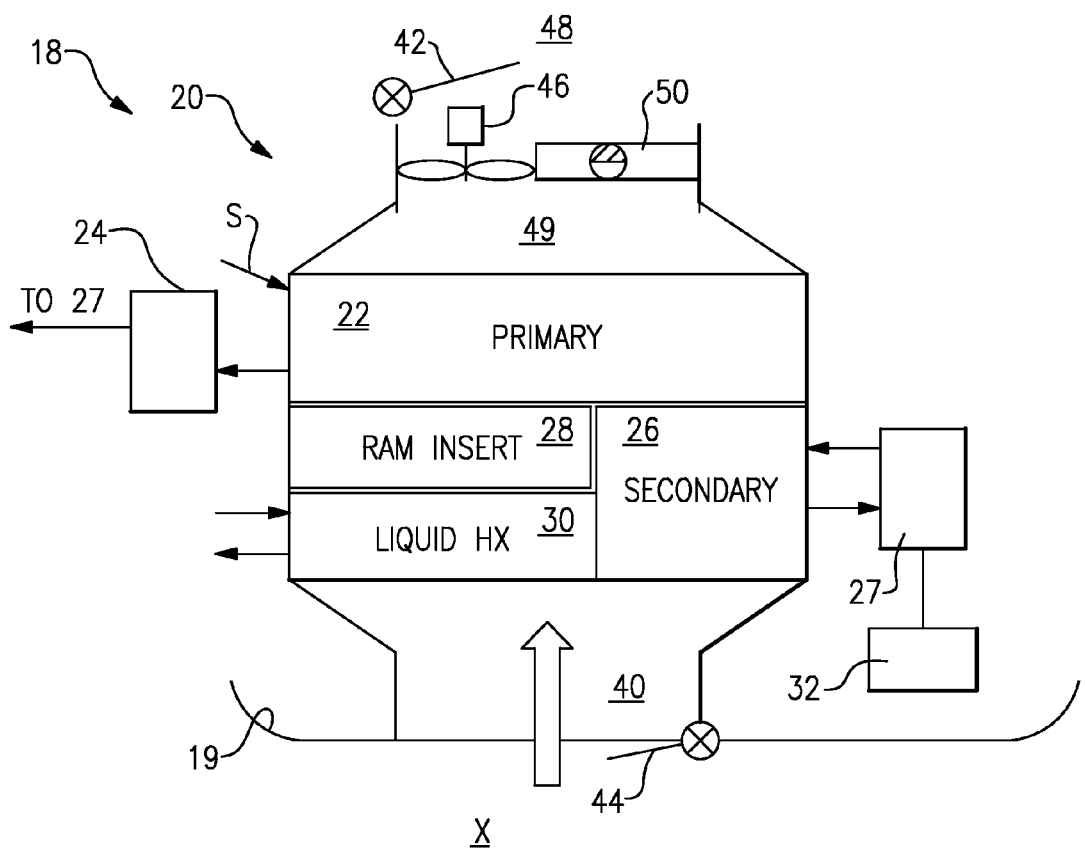
FIG. 1 schematically shows an air supply system for an aircraft including a heat exchanger pack.

An environmental control system 18 for use on an aircraft includes a heat exchanger pack 20. A primary heat exchanger 22 receives a supply S of the air, such as from a compressor, and delivers that air to a portion of an air cycle machine 24. The air cycle machine 24 sends the air to another portion 27 of the air cycle machine, which circulates this air through a secondary heat exchanger 26. A liquid heat exchanger 30 for cooling liquids, such as liquids utilized to cool electronic components, is also positioned within the heat exchanger pack 20, as is a ram insert 28. Downstream of the portion 27 of the air cycle machine, the air is delivered to uses 32 on the aircraft, such as the cabin, the cockpit or any other number of uses.

An inlet 40 for ram air passing across the heat exchanger 22, 26 and 30 extends to receive air from a location X, which is outside the aircraft body 19. Doors 42 and 44 may isolate the heat exchanger pack 20 when no air flow is desired. However, when the aircraft is on the ground, a fan 46 pulls the air across the heat exchangers to cool the air and liquid within the heat exchangers 22, 26 and 30. It should be understood that the air flow being drawn by the fan 46 is maintained separate from the air within the heat exchangers 22 and 26 and the liquid within heat exchanger 30.

A chamber 49 is downstream of the heat exchangers (here heat exchanger 22). An area 48 downstream of the fan 46 receives air flow after it has passed through the heat exchanger pack 20.

When the aircraft is at altitude in the air, the fan 46 capacity is limited. At this point, the movement of the airplane will drive the air flow across the heat exchanger pack 30. A check valve 50 operates to allow air to pass from chamber 49 to the chamber 48 bypassing the fan 46.

The ground-based operation is shown in FIG. 2A. The check valve 50 is spring biased as shown schematically at 56 to sit against a valve seat 54, closing off an opening 55 through the valve seat 54. A second valve plate 60 is spring biased at 58 to sit against a valve seat 63 and close off an opening 62. In the position illustrated in FIG. 2A, the fan 46 is being driven and the air flow F passing to the chamber 48 passes through the fan 46, and a bypass flow passage 149 does not receive significant air flow.

FIG. 2B shows the position of the valve 50 when the fan 46 capacity is limited as shown at f, such as when the aircraft is in the air. The air flow F biases the valve 50 to an open position, and the air flow F can pass through the opening 55 from the passage 149 into the chamber 48 bypassing the fan 46. Again, this is the typical operation as was known in the prior art.

FIG. 2C shows an improvement over the prior valves.

Notably, the second valve plate 60 is not part of the prior art. When the fan 46 begins to surge or see too little air flow, the discharge pressure of the air leaving the fan 46 increases. At some point, this discharge pressure will overcome the spring force 58, and the air flow will cause the valve plate 60 to open as shown in FIG. 2C. A return portion R of the air delivered by the fan 46 passes through the opening 62 and back to the chamber 49. Since the chamber 49 is downstream of the heat exchangers, this air is allowed to move back to the fan 46 at its inlet and with no problem from potentially clogged passages in the heat exchangers. As shown, there is air flow f still heading toward chamber 48, however, it is was likely a lesser flow than the air flow f in FIGS. 2A or 2B.

The second check valve may be located at other locations, of course, and serves to address the surge concern for a fan and, particularly, one associated with a heat exchanger pack.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A fan and bypass combination comprising:

a selectively driven fan and a bypass flow passage for bypassing said fan, said bypass flow passage communicating with a first check valve selectively movable to a bypass position to allow air to flow from said bypass flow passage to a downstream location;

a second check valve movable to a return position for allowing air driven by said fan to pass into a return passage, and return to an inlet of said fan in the event that a discharge pressure from said fan overcomes a spring force associated with said second check valve;

wherein said return passage is said bypass flow passage;

wherein said second check valve is associated with said first check valve, and moves with said first check valve when said first check valve moves to said bypass position; and wherein said first check valve moves away from a first valve plate in said bypass position, and said second check valve moves away from said check valve when in said return position.

2. A heat exchanger pack comprising:

at least one heat exchanger associated with a cooling air flow, and said at least one heat exchanger being positioned intermediate a cooling air inlet and a fan, and a check valve;

said fan being selectively driven to move cooling air over said at least one heat exchanger, and a bypass flow passage for bypassing said fan, said bypass flow passage communicating with a first check valve selectively movable to a bypass position to allow air to flow from said bypass flow passage to a downstream location, a second check valve movable to a return position for allowing air driven by said fan to pass into a return passage, and return to an inlet of said fan in the event that a discharge pressure from said fan overcomes a spring force associated with said second check valve;

wherein said return passage is said bypass flow passage;

wherein said second check valve is associated with said first check valve, and moves with said first check valve when said first check valve moves to said bypass position; and wherein said first check valve moves away from a first valve plate in said bypass position, and said second check valve moves away from said first check valve when in said return position.

3. An environmental control system for use on an aircraft comprising:

an air cycle machine for delivering air to uses on an aircraft, and said air cycle machine passing air through at least one heat exchanger;

said at least one heat exchanger associated with a cooling air flow, and said at least one heat exchanger being positioned intermediate a cooling air inlet and a fan, and a check valve;

said fan being selectively driven to move cooling air over said at least one heat exchanger, and a bypass flow passage for bypassing said fan, said bypass flow passage communicating with a first check valve selectively movable to a bypass position to allow air to flow from said bypass flow passage to a downstream location, a second check valve movable to a return position for allowing air driven by said fan to pass into a return passage, and to an inlet of said fan in the event that the discharge pressure from said fan overcomes a spring force associated with said second check valve;

wherein said return passage is said bypass flow passage;

wherein said second check valve is associated with said first check valve, and moves with said first check valve when said first check valve moves to said bypass position; and wherein said first check valve moves away from a first valve plate in said bypass mode, and said second check valve moves away from said first check valve when in said return position.

* * * * *